(12) United States Patent
Chu et al.

(10) Patent No.: US 12,144,064 B1
(45) Date of Patent: *Nov. 12, 2024

(54) TRANSMITTING NETWORK MANAGEMENT INFORMATION IN A WIRELESS LOCAL AREA NETWORK

(71) Applicant: Marvell Asia Pte Ltd, Singapore (SG)

(72) Inventors: Liwen Chu, San Ramon, CA (US); Hongyuan Zhang, Fremont, CA (US); Hui-Ling Lou, Sunnyvale, CA (US)

(73) Assignee: Marvel Asia Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/375,302

(22) Filed: Sep. 29, 2023

Related U.S. Application Data

(63) Continuation of application No. 17/698,856, filed on Mar. 18, 2022, now Pat. No. 11,778,690, which is a continuation of application No. 16/797,919, filed on Feb. 21, 2020, now Pat. No. 11,284,474.

(60) Provisional application No. 62/808,740, filed on Feb. 21, 2019.

(51) Int. Cl.
| | |
|---|---|
| H04W 80/02 | (2009.01) |
| H04W 72/30 | (2023.01) |
| H04W 76/11 | (2018.01) |
| H04W 84/12 | (2009.01) |

(52) U.S. Cl.
CPC .......... *H04W 80/02* (2013.01); *H04W 72/30* (2023.01); *H04W 76/11* (2018.02); *H04W 84/12* (2013.01)

(58) Field of Classification Search
CPC ..... H04W 80/02; H04W 72/30; H04W 76/11; H04W 84/12
See application file for complete search history.

(56) References Cited

U.S. PATENT DOCUMENTS

| | | |
|---|---|---|
| 11,778,690 B1 | 10/2023 | Chu et al. |
| 2016/0073429 A1* | 3/2016 | Oteri ............... H04W 4/08 370/338 |
| 2017/0367129 A1 | 12/2017 | Yang |
| 2018/0167879 A1 | 6/2018 | Kim et al. |
| 2019/0124706 A1 | 4/2019 | Huang et al. |
| 2019/0215884 A1 | 7/2019 | Patil et al. |

(Continued)

OTHER PUBLICATIONS

IEEE 802.11-18/0390r4; IEEE P802.11 Wireless LANs, Viger et al.; May 2018; (Year: 2018).*

(Continued)

*Primary Examiner* — Mohammed S Chowdhury

(57) ABSTRACT

An access point (AP) allocates a broadcast resource unit (RU), and ii) one or more other RUs for a multi-user physical layer protocol data unit (MU PPDU). The AP generates the MU PPDU to include i) a physical layer (PHY) preamble, and ii) a management medium access control layer (MAC) frame in the broadcast RU. When the AP device is allowing unassociated stations to associate with the AP device, the AP device sets a station identifier in the PHY preamble corresponding to the broadcast RU to a first value that indicates the AP device is allowing unassociated stations to associate with the AP device. When the AP device is not allowing unassociated stations to associate with the AP device, the AP device sets the station identifier to a second value that indicates the AP device is not allowing unassociated stations to associate with the AP device.

18 Claims, 3 Drawing Sheets

(56) References Cited

U.S. PATENT DOCUMENTS

| | | | |
|---|---|---|---|
| 2020/0037325 A1 | 1/2020 | Chu et al. | |
| 2020/0037395 A1* | 1/2020 | Ko | H04W 72/0446 |
| 2020/0092881 A1* | 3/2020 | Nezou | H04W 72/535 |
| 2020/0112910 A1* | 4/2020 | Cherian | H04W 48/10 |
| 2020/0221292 A1* | 7/2020 | Li | H04L 61/5038 |

OTHER PUBLICATIONS

Zhang et al., "EHT Technology Candidate Discussions," doc: IEEE 802.11-18/1161 r0, The Institute of Electrical and Electronics Engineers, Inc., pp. 1-10 Jul. 10, 2018.

IEEE P802.11ax™/D4.0, "Draft Standard for Information technology—Telecommunications and information exchange between systems Local and metropolitan area networks—Specific Requirements, Part 11 : Wireless LAN Medium Access Control (MAC) and Physical Layer (PHY) Specifications, Amendment 1: Enhancements for High Efficiency Wlan," IEEE Computer Society, 746 pages (Feb. 2019).

IEEE P802.11ax™M/D5.0, "Draft Standard for Information technology—Telecommunications and information exchange between systems Local and metropolitan area networks—Specific Requirements, Part 11 : Wireless LAN Medium Access Control (MAC) and Physical Layer (PHY) Specifications, Amendment 1: Enhancements for High Efficiency Wlan," IEEE Computer Society, 772 pages (Oct. 2019).

Viger et al., "IEEE P802.11—Wireless LANs," Doc. No. IEEE 802.11-18/0390r4, The Institute for Electrical and Electronics Engineers (IEEE), May 2018.

\* cited by examiner

TRANSMITTING NETWORK MANAGEMENT INFORMATION IN A WIRELESS LOCAL AREA NETWORK

CROSS REFERENCES TO RELATED APPLICATIONS

The present application is a continuation of U.S. application Ser. No. 17/698,856, filed on Mar. 18, 2022, entitled "Transmitting Network Management Information in a Wireless Local Network," which is a continuation application of U.S. application Ser. No. 16/797,919, filed on Feb. 21, 2020, entitled "Transmitting Network Management Information in a Wireless Local Network," which claims the benefit of U.S. Provisional Patent Application No. 62/808,740, entitled "Basic Service Set (BSS) Information Broadcast for Association," filed on Feb. 21, 2019. All of the applications referenced above are hereby incorporated by reference in their entireties.

FIELD OF TECHNOLOGY

The present disclosure relates generally to wireless communication systems, and more particularly to transmitting management information in a wireless communication network.

BACKGROUND

Wireless local area networks (WLANs) have evolved rapidly over the past two decades, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. The IEEE 802.11ax Standard now in the final stage of development significantly improves throughput over the IEEE 802.11ac Standard.

Communication devices (e.g., access points (APs)) that manage a WLAN often transmit management frames, such as beacon frames, to announce the presence of a WLAN and to allow other communication devices (e.g. client stations) to discover the WLAN. According to the IEEE 802.11ac Standard and earlier IEEE 802.11 Standards, the AP transmits management frames intended for client stations that have not yet joined the WLAN (sometimes referred to as "unassociated stations") alone, i.e., the AP does not simultaneously transmit other frames such as frame intended for client stations that have already joined the WLAN (sometimes referred to as "associated stations"). For example, according to the IEEE 802.11ac Standard and earlier IEEE 802.11 Standards, beacon frames intended for unassociated stations are transmitted in a legacy packet format defined by the IEEE 802.11a Standard to ensure that legacy stations are able to process the beacon frames. Communication devices that are seeking to discover a network are typically configured to scan through various channels until at least one management frame (e.g., a beacon frame) is received by the communication device.

SUMMARY

In an embodiment, a method for transmitting management information in a wireless local area network (WLAN) managed by an access point (AP) device includes: generating, at the AP device, a management medium access control layer (MAC) frame having information indicating network parameters of the WLAN managed by the AP device; generating, at the AP device, one or more other MAC frames for one or more client stations that are associated with the WLAN; allocating, at the AP device, a plurality of resource units (RUS) for a multi-user physical layer protocol data unit (MU PPDU), the plurality of RUs including i) a broadcast RU, and ii) one or more other RUs; and generating, at the AP device, the MU PPDU to include i) a physical layer (PHY) preamble, ii) the management MAC frame in the broadcast RU, and iii) the one or more other MAC frames in the one or more other RUs. Generating the MU PPDU includes: in response to the AP device determining that the AP device is allowing unassociated stations to associate with the AP device, setting a station identifier in the PHY preamble corresponding to the broadcast RU to a first value that indicates the AP device is allowing unassociated stations to associate with the AP device, and in response to the AP device determining that the AP device is not allowing unassociated stations to associate with the AP device, setting the station identifier in the PHY preamble corresponding to the broadcast RU to a second value that indicates the AP device is not allowing unassociated stations to associate with the AP device. The method further includes transmitting, by the AP device, the MU PPDU.

In another embodiment, an AP configured for operation according to at least a first communication protocol comprises a wireless network interface having circuitry configured to: generate a management MAC frame having information indicating network parameters of the WLAN managed by the AP device; generate one or more other MAC frames for one or more client stations that are associated with the WLAN; allocate a plurality of RUs for an MU PPDU, the plurality of RUs including i) a broadcast RU, and ii) one or more other RUs; and generate the MU PPDU to include i) a PHY preamble, ii) the management MAC frame in the broadcast RU, and iii) the one or more other MAC frames in the one or more other Rus. Generating the MU PPDU includes: in response to the circuitry determining that the AP device is allowing unassociated stations to associate with the AP device, setting a station identifier in the PHY preamble corresponding to the broadcast RU to a first value that indicates the AP device is allowing unassociated stations to associate with the AP device, and in response to the circuitry determining that the AP device is not allowing unassociated stations to associate with the AP device, setting the station identifier in the PHY preamble corresponding to the broadcast RU to a second value that indicates the AP device is not allowing unassociated stations to associate with the AP device. The circuitry is further configured to control the wireless network interface to transmit the MU PPDU.

DETAILED DESCRIPTION

In embodiments described below, a wireless communication device such as an access point (AP) in a wireless network, such as a wireless local area network (WLAN) managed by the AP, transmits management frames, such as beacon frames and probe response frames, to wireless communication devices that have not yet joined the wireless network (sometimes referred to herein as "unassociated stations"). To improve system throughput, a management frame intended for unassociated stations (such as a beacon frame, a probe response frame, etc.) is transmitted in a multi-user (MU) physical layer (PHY) protocol data unit (PPDU) along with one or more frames intended for communication devices that already joined the wireless network (sometimes referred to herein as "associated stations"), such as broadcast management frames for associated stations, unicast frames for associated stations, etc., according to some embodiments.

The use of an MU PPDU that includes both a management frame for unassociated stations and one or more other frames for associated stations is useful, for example, in the 6 GHz radio frequency (RF) band in which legacy devices such as IEEE 802.11a and IEEE 802.11n devices (which cannot process MU PPDUs) cannot operate, at least in some embodiments. Additionally, according to the current draft of the IEEE 802.11ax Standard, in some scenarios an AP is required to transmit certain management frames for unassociated stations (e.g., beacon frames, unsolicited probe response frames, etc.) at least every 20 milliseconds. The use of MU PPDUs that include both these certain management frames for unassociated stations and other frames for associated stations is useful to improve throughput when the AP is required to transmit these certain management frames at least every 20 milliseconds, at least in some embodiments.

Figure 1:
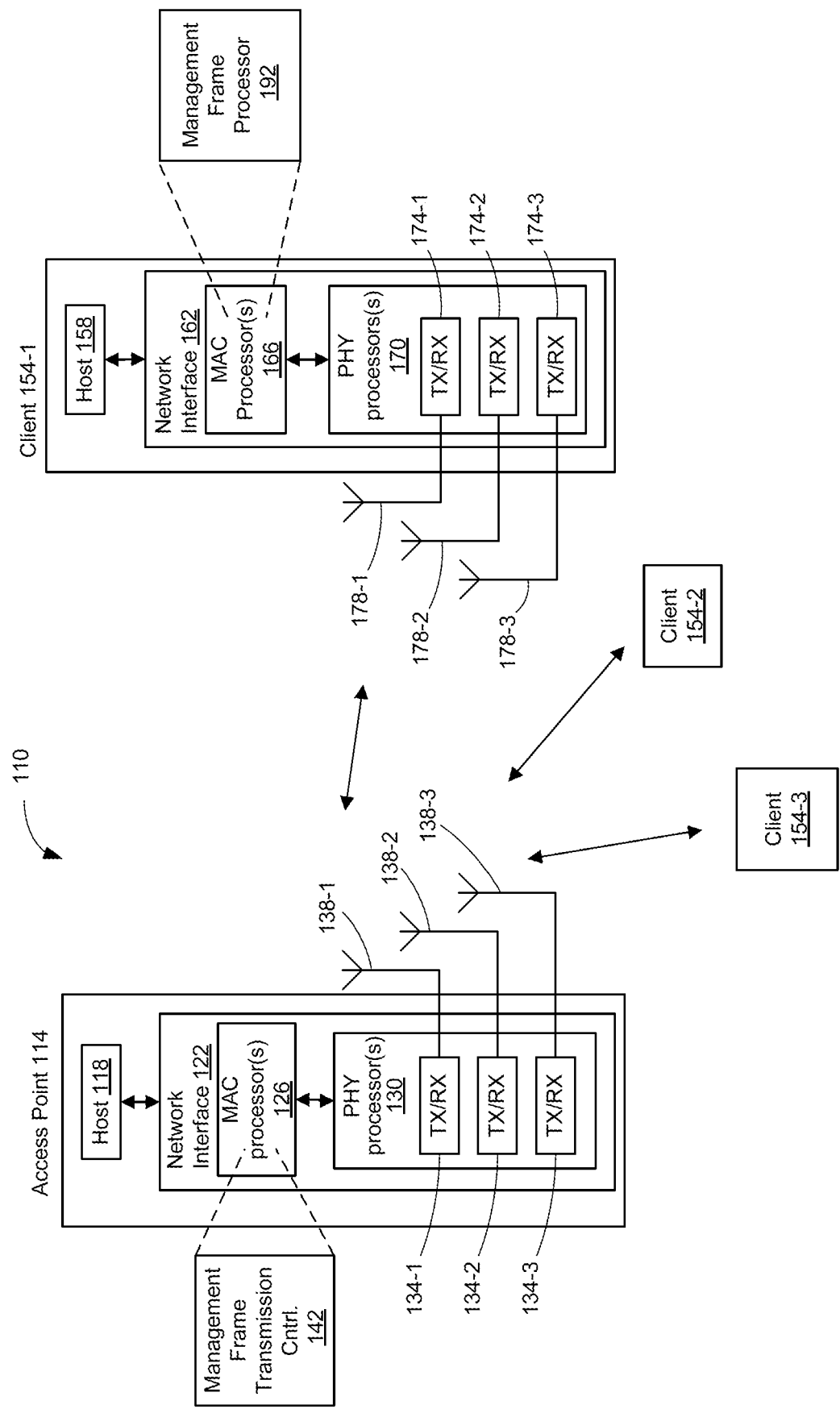
FIG. 1 is a block diagram of an example wireless local area network (WLAN) in which an access point (AP) transmits a multi-user (MU) physical layer (PHY) protocol data unit (PPDU) having both i) a management frame intended for unassociated stations, and ii) one or more other frames intended for associated stations, according to an embodiment.

FIG. 1 is a block diagram of an example WLAN 110, according to an embodiment. The WLAN 110 includes an AP 114 that comprises a host processor 118 coupled to a wireless network interface device 122. The wireless network interface device 122 includes one or more medium access control (MAC) processors 126 (sometimes referred to herein as "the MAC processor 126" for brevity) and one or more PHY processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

In an embodiment, the wireless network interface device 122 is configured for operation within a single RF band at a given time. In another embodiment, the wireless network interface device 122 is configured for operation within two or more RF bands at the same time or at different times. In an embodiment, the wireless network interface device 122 implements multiple MAC entities that operate in respective ones of the frequency bands and that have respective MAC addresses. For example, in an embodiment, the wireless network interface device 122 includes multiple PHY processors 130, where respective PHY processors 130 correspond to respective ones of the co-located APs for operation in respective ones of the frequency bands. In another embodiment, the wireless network interface device 122 includes a single PHY processor 130, where each transceiver 134 includes respective RF radios corresponding to respective ones of the co-located APs for operation in respective ones of the frequency bands.

The wireless network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. The first IC and the second IC may be packaged together in a single IC package thereby forming a modular device, or the first IC and the second IC may be coupled together on a single printed board, for example, in various embodiments. As another example, at least a portion of the MAC processor 126 and at least a portion of the PHY processor 130 may be implemented on a single IC. For instance, the wireless network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the wireless network interface device 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

PHY data units are sometimes referred to herein as "packets", and MAC layer data units are sometimes referred to herein as "frames".

In connection with generating one or more RF signals for transmission, the PHY processor 130 is configured to process (which may include modulation, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulation, filtering, etc.) the one or more digital baseband signals to generate a PPDU.

The PHY processor 130 includes amplifiers (e.g., a low noise amplifier (LNA), a power amplifier, etc.), an RF downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals, for example, by providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In another embodiment, the MAC processor 126 includes a hardware state machine.

The MAC processor 126 includes, or implements, a management frame transmission controller 142. The management frame transmission controller 142 controls transmission of management frames by the AP 114. As will be described in more detail below, the management frame transmission controller 142 generates a management frame (e.g., a beacon frame, a probe response frame, etc.) that includes information for unassociated stations to join a basic service set (BSS) managed by the AP 114, and prompts the PHY processor 130 to transmit the management frame to client stations 154 to allow with client stations 154 client stations 154 that are not associated with the AP 114 to discover presence of and/or to join the BSS managed by the AP 114. In various embodiments, the management frame transmission controller 142 prompts the PHY processor 130 to transmit the management frame according to PHY formats discussed in more detail below. For example, in some embodiments, the management frame transmission controller 142 prompts the PHY processor 130 to transmit the management frame within a multi-user (MU) PPDU that includes one or more other frames intended for client stations 154 already associated with the BSS managed by the AP 114. In some embodiments, the MU PPDU is formatted to indicate that the MU PPDU includes information for client stations 154 not yet associated with the BSS managed by the AP 114. In other embodiments, the network management controller 142 prompts the PHY processor 130 to transmit the management frame within a single-user (SU) PPDU that is formatted to indicate that the SU PPDU includes information for client stations 154 not yet associated with the BSS managed by the AP 114.

In an embodiment, the management frame transmission controller 142 is implemented by a processor executing machine readable instructions stored in a memory, where the machine readable instructions cause the processor to perform acts described in more detail below. In another embodiment, the management frame transmission controller 142 additionally or alternatively comprises one or more hardware state machines that are configured to perform acts described in more detail below.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a wireless network interface device 162. The wireless network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

In an embodiment, the wireless network interface device 162 is configured for operation within a single RF band at a given time. In another embodiment, the wireless network interface device 162 is configured for operation within two or more RF bands at the same time or at different times. For example, in an embodiment, the wireless network interface device 162 includes multiple PHY processors 170, where respective PHY processors 170 correspond to respective RF bands. In another embodiment, the wireless network interface device 162 includes a single PHY processor 170, where each transceiver 174 includes respective RF radios corresponding to respective RF bands. In an embodiment, the wireless network interface device 162 includes multiple MAC processors 166, where respective MAC processors 166 correspond to respective RF bands. In another embodiment, the wireless network interface device 162 includes a single MAC processor 166 corresponding to the multiple RF bands.

The wireless network interface device 162 is implemented using one or more ICs configured to operate as discussed below. For example, the MAC processor 166 may be implemented on at least a first IC, and the PHY processor 170 may be implemented on at least a second IC. The first IC and the second IC may be packaged together in a single IC package thereby forming a modular device, or the first IC and the second IC may be coupled together on a single printed board, for example, in various embodiments. As another example, at least a portion of the MAC processor 166 and at least a portion of the PHY processor 170 may be implemented on a single IC. For instance, the wireless network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the wireless network interface device 162 may be implemented on a single IC.

In various embodiments, the MAC processor 166 and the PHY processor 170 of the client station 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

The MAC processor 126 includes, or implements, a management frame processor 192. The management frame processor 192 processes management frames transmitted by the AP 114, for example. As will be described in more detail below, the management frame processor 192 processes management frames that includes information for unassociated stations to join a BSS managed by the AP 114, at least when the client station 154 has not yet joined the BSS. For example, in some embodiments, the management frame processor 192 processes a management frame that was received within an MU PPDU that also includes one or more other frames intended for client stations 154 already associated with the BSS managed by the AP 114. In some embodiments, the MU PPDU is formatted to indicate that the MU PPDU includes information for client stations 154 not yet associated with the BSS managed by the AP 114. In other embodiments, the management frame processor 192 processes a management frame that was included within an SU PPDU that is formatted to indicate that the SU PPDU includes information for client stations 154 not yet associated with the BSS managed by the AP 114.

In an embodiment, each of the client stations 154-2 and 154-3 has a structure that is the same as or similar to the client station 154-1. In an embodiment, one or more of the client stations 154-2 and 154-3 has a different suitable structure than the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2:
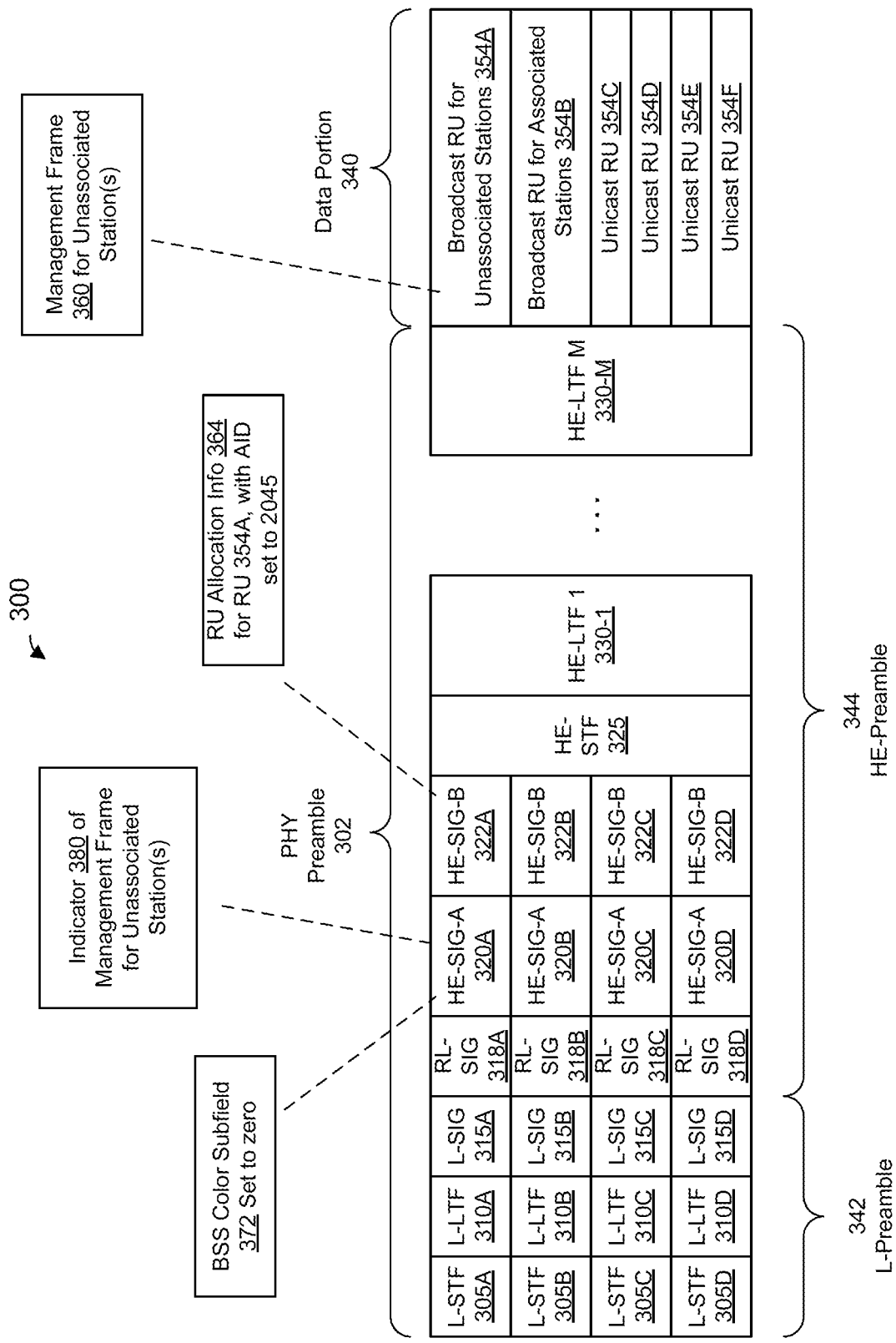
FIG. 2 is a block diagram of an example MU PPDU transmitted by the AP of FIG. 1, according to an embodiment.

FIG. 2 is a diagram of an example MU PPDU 300 that the wireless network interface device 122 (FIG. 1) is configured to generate and transmit to multiple client stations 154, according to an embodiment. As discussed in more detail below, the MU PPDU 300 permits simultaneous transmission of independent data streams to different client stations. For example, in some embodiments, the MU PPDU 300 includes i) a management frame (e.g., a beacon frame, a probe response frame, etc.) intended for client stations 154 that have not yet joined a WLAN (e.g., a BSS) managed by the AP 114 (e.g., unassociated stations), and one or both of ii) a management frame intended for client stations 154 that have already joined the WLAN (e.g., a BSS) managed by the AP 114 (e.g., associated stations), and iii) one or more unicast frames intended for one or more associated stations. In contrast, prior art WLANs did not contemplate a single PPDU that included both i) a management frame intended for unassociated stations and ii) other frames. Rather, prior art WLANs only transmitted a management frame intended for unassociated stations by itself or with duplicates of the management frame.

The MU PPDU 300 includes a PHY preamble 302 including a legacy short training field (L-STF) 305, a legacy long training field (L-LTF) 310, a legacy signal field (L-SIG) 315, a repeated L-SIG field (RL-SIG) 318, a high efficiency (HE) signal field (HE-SIG-A) 320, an HE signal field (HE-SIG-B) 322, an HE short training field (HE-STF) 325, and M HE long training fields (HE-LTFs) 330, where M is a suitable positive integer. In an embodiment, M generally corresponds to (e.g., is greater than or equal to) a number of spatial streams via which the MU PPDU 300 will be transmitted. A legacy preamble portion 342 of the preamble 302 includes the L-STF 305, L-LTF 310 and L-SIG 315. An HE preamble portion 344 of the preamble 302 includes the RL-SIG 318, the HE-SIG-A 320, the HE-SIG-B 322, the HE-STF 325 and the M HE-LTFs 330. The MU PPDU 300 also includes a data portion 340.

The L-STF 305 generally includes information that is useful for packet detection and synchronization, whereas the L-LTF 310 generally includes information that is useful for channel estimation and fine synchronization. The L-SIG 315 generally signals PHY parameters to the receiving devices, including legacy devices, such as a length of the PPDU 300. The RL-SIG 318 is a repetition of the L-SIG 315 is used to signal that the MU PPDU 300 corresponds to a protocol defined by the IEEE 802.11ax Standard.

The HE-STF 325 generally includes information that is useful for improving automatic gain control estimation in a MIMO transmission. The HE-LTFs 330 generally includes information that is useful for estimating a MIMO channel.

In some embodiments, the PHY preamble 302 omits one or more of the fields 305-330. In some embodiments, the preamble 302 includes additional fields not illustrated in FIG. 2.

Each of the L-STF 305, the L-LTF 310, the L-SIG 315, the RL-SIG 318, the HE-SIG-A 320, the HE-SIG-B 322, the HE-STF 325, and the M HE-LTFs 330 comprises one or more OFDM symbols. As merely an illustrative example, the HE-SIG-A 320 comprises two OFDM symbols.

In the illustration of FIG. 2, the MU PPDU 300 spans an 80 MHz bandwidth of a composite communication channel that includes multiple 20 MHz-wide sub-channels. Each of the L-STF 305, the L-LTF 310, the L-SIG 315, the RL-SIG 318, and the HE-SIG-A 320 is repeated in each 20 MHz sub-channel of the composite communication channel, in an embodiment. For MU PPDUs of other bandwidths (e.g., 40 MHz, 160 MHZ, 320 MHZ), each of the L-STF 305, the L-LTF 310, the L-SIG 315, the RL-SIG 318, and the HE-SIG-A 320 is repeated in each 20 MHz sub-channel of the whole bandwidth of the MU PPDU 300, in an embodiment. In embodiments that permit punctured sub-channels in which one or more 20 MHz sub-channels within a wider composite communication channel are not used, the L-STF 305, the L-LTF 310, the L-SIG 315, the RL-SIG 318, and the HE-SIG-A 320 are not transmitted in the punctured sub-channels.

In the illustration of FIG. 2, a respective HE-SIG-B 322 is included in each 20 MHz sub-channel of the composite communication channel, in an embodiment. In embodiments that permit punctured sub-channels in which one or more 20 MHz sub-channels within a wider composite communication channel are not used, the HE-SIG-B 322 is not transmitted in the punctured sub-channels. In some embodiments, at least some of the HE-SIG-Bs 322 include different information.

In an embodiment, the HE-SIG-A 320 generally includes information about the format of the MU PPDU 300, such as information needed to properly decode at least a portion of the MU PPDU 300. In some embodiments, HE-SIG-A 320 additionally includes information for receivers that are not intended receivers of the PPDU 300, such as information needed for medium protection, spatial reuse, etc.

In an embodiment, each HE-SIG-B 322 generally includes allocation information regarding resource units (RUs) 354 corresponding to the data portion 340, such as which RUs 354 are included in the data portion 340 and which client stations are assigned to which RUs 354. RUs 354 correspond to different frequency segments within a frequency bandwidth spanned by the MU PPDU 300. In an embodiment, each RU 354 is allocated to one or more client stations 154, or to a broadcast. In an embodiment, the independent data streams in one or more respective allocated RUs 354 are further transmitted using respective spatial streams, allocated to the client stations 154, using MU multiple-input multiple-output (MU-MIMO) transmission techniques. In an embodiment, the MU PPDU 300 is an MU-MIMO PHY data unit in which independent data streams are simultaneously transmitted to or by multiple client stations 154 using respective spatial streams allocated to the client stations 154.

As illustrated in FIG. 2, the RU 354A includes a management frame 360 that is intended to be received by unassociated stations. In an embodiment, the management frame 360 includes a beacon frame having information indicating parameters of the BSS managed by the AP 114, such as one or more of i) an indication of a primary component channel of the BSS, ii) an identifier (e.g., service set identifier (SSID)) associated with the BSS, iii) security parameters of the BSS, iv) capability information regarding capabilities of the AP 114, etc. In another embodiment, the management frame 360 includes a probe response frame having information indicating parameters of the BSS managed by the AP 114, such as parameters described above or other suitable parameters. In an embodiment, the probe response is unsolicited, e.g., the probe response frame is not transmitted in response to receiving a probe request frame from an unassociated station. In another embodiment, the probe response is transmitted in response to receiving a probe request frame with a receiver address set to a broadcast address.

According to an embodiment, probe response frames include some of the information included in beacon frames, but omits other information included in beacon frames that is not relevant for unassociated stations, such as a traffic information map (TIM) element that indicates whether the AP includes buffered data for respective client stations.

In an embodiment, another RU 354 in the data portion 340 (e.g., RU 354B) includes a management frame that is intended to be received by associated stations. In another embodiment, one or more RUs 354 (e.g., RUs 354C-F) in the data portion 340 additionally or alternatively include one or more unicast frames that are intended for one or more respective associated stations.

The HE-SIG-Bs 322 includes RU allocation information regarding the data portion 340. For example, at least one of the HE-SIG-Bs 322 includes RU allocation information 364 corresponding to the RU 354A. In an embodiment, the RU allocation information 364 indicates i) a frequency portion of the communication channel that corresponds to the RU 354A, and ii) that the RU 354A corresponds to a station identifier (e.g., an association identifier (AID) or another suitable identifier) set to a value that indicates the RU 354A is a broadcast RU intended for unassociated stations. In some embodiments, the RU allocation information 364 indicates that the RU 354A corresponds to an AID set to a value indicating that the RU 354A includes a frame intended for one or more unassociated stations. For example, in an embodiment, the RU allocation information 364 indicates the RU 354A corresponds to an AID set to 2045, which a communication protocol specifies as indicating unassociated stations. In another embodiment, the RU 354A includes a probe response frame for an unassociated station and the RU allocation information 364 indicates the RU 354A corresponds to an AID set to 2044, which a communication protocol specifies as indicating an RU for transmitting a probe response frame. In other embodiments, the RU allocation information 364 indicates the RU 354A corresponds to an AID set to another suitable value that a communication protocol specifies as indicating one or both of i) unassociated stations, ii) an RU for transmitting a management frame intended for one or more unassociated stations.

In an embodiment, when a client station 154 is unassociated with an AP and is seeking to become associated with an AP, the client station 154 is configured (e.g., the wireless network interface device 162 is configured, the PHY processor 170 is configured, the MAC processor 162 is configured, the management frame processor 192 is configured, etc.) to analyze the RU allocation information 364 to determine that the RU 354A corresponds to an AID set to 2045, which indicates that the RU 354A includes a frame for unassociated stations. In another embodiment, when a client station 154 is unassociated with an AP and is seeking to become associated with an AP, the client station 154 is configured (e.g., the wireless network interface device 162 is configured, the PHY processor 170 is configured, the MAC processor 162 is configured, the management frame processor 192 is configured, etc.) to analyze the RU allocation information 364 to determined that the RU 354A corresponds to an AID set to 2044, which indicates that the RU 354A includes a probe response frame for unassociated stations. In other embodiments, when a client station 154 is unassociated with an AP and is seeking to become associated with an AP, the client station 154 is configured (e.g., the wireless network interface device 162 is configured, the PHY processor 170 is configured, the MAC processor 162 is configured, the management frame processor 192 is configured, etc.) to analyze the RU allocation information 364 to determined that the RU allocation information 364 indicates the RU 354A corresponds to an AID set to another suitable value that a communication protocol specifies as indicating one or both of i) unassociated stations, ii) an RU for transmitting a management frame intended for one or more unassociated stations.

In an embodiment, when a client station 154 is unassociated with an AP and is seeking to become associated with an AP, and when the client station 154 determines (e.g., the wireless network interface device 162 determines, the PHY processor 170 determines, the MAC processor 162 determines, the management frame processor 192 determines, etc.) that the RU allocation information 364 indicates an RU with a frame for unassociated stations, the client station 154 processes (e.g., the wireless network interface device 162 processes, the PHY processor 170 processes, the MAC processor 162 determines, the management frame processor 192 processes, etc.) the frame for unassociated stations and, when appropriate uses information in the frame to become associated with the AP. In an embodiment, when a client station 154 is unassociated with an AP and is seeking to become associated with an AP, when the client station 154 determines (e.g., the wireless network interface device 162 determines, the PHY processor 170 determines, the MAC processor 162 determines, the management frame processor 192 determines, etc.) that the RU allocation information 364 does not indicate any RU with frames for unassociated stations, the client station 154 stops processing the MU PPDU.

Additionally, at least one of the HE-SIG-Bs 322 includes RU allocation information 364 corresponding to one or more other RUs (e.g., RUs 354B-F), and which indicates the one or more RUs are intended for one or more associated stations. As an illustrative embodiment, the RU allocation information indicates i) a frequency portion of the communication channel that corresponds to the RU 354B, and ii) that the RU 354B corresponds to a station identifier (e.g., an AID or another suitable identifier) set to a value that indicates the RU 354B is a broadcast RU intended for associated stations. In an embodiment, the RU allocation information indicates the RU 354B corresponds to an AID set to 2047, which indicates the RU 354B is a broadcast RU intended for associated stations. In an embodiment, the broadcast RU 354B includes a broadcast management frame intended for associated stations. In an embodiment, the broadcast RU 354B includes a beacon frame intended for associated stations.

In some embodiments, the broadcast RU 354A includes a first beacon frame intended for unassociated stations, and the broadcast RU 354B includes a second beacon frame intended for associated stations.

In some embodiments, the broadcast RU 354A includes a probe response frame intended for unassociated stations, and the broadcast RU 354B includes a beacon frame intended for associated stations.

In other embodiments, the MU PPDU 300 does not include a broadcast RU intended for associated stations. As another illustrative embodiment, the RU allocation information additionally indicates i) respective frequency portions of the communication channel that corresponds to the RUs 354C-F, and ii) that the RUs 354C-F correspond to respective station identifiers (e.g., AIDs or other suitable identifiers) set to respective values that indicate respective associated stations (e.g., the RUs 354C-F are unicast RUs). In other embodiments, the MU PPDU 300 does not include any unicast RUs. For purposes of the present disclosure, an RU for transmitting independent data to multiple particular associated client stations using MU-MIMO is also considered a "unicast RU."

In an embodiment, when the RU allocation information in the HE-SIG-Bs 322 includes RU allocation information that corresponds to an AID set to at least one of i) a value that a communication protocol specifies as indicating at unassociated stations, or ii) a value that the communication protocol specifies as indicating an RU for transmitting a management frame intended for one or more unassociated stations, this signals to client stations that the AP is allowing unassociated stations to associate with the AP; whereas when the RU allocation information in the HE-SIG-Bs 322 does not include RU allocation information that corresponds i) an AID set to a value that a communication protocol specifies as indicating at unassociated stations, nor ii) an AID set a value that the communication protocol specifies as indicating an RU for transmitting a management frame intended for one or more unassociated stations, this signals to client stations that the AP is not allowing unassociated stations to associate with the AP.

In an embodiment, the HE-SIG-A 320 includes a BSS color identifier field 372. A BSS color identifier is a shortened network identifier that is used by WLAN devices to distinguish between transmissions from different neighboring WLANs. For example, APs of different neighboring WLANs choose different BSS color identifiers, which allows each device in the different WLANs to distinguish transmissions in their own WLAN from transmissions from neighboring WLANs. In an embodiment, the BSS color identifier field 372 of the MU PPDU 300 not set to the BSS color of the WLAN 110, but rather is set to a value that a communication protocol specifies i) for indicating that the MU PPDU 300 includes a transmission intended for one or more unassociated stations and ii) cannot be chosen by an AP as the BSS color identifier for a WLAN (e.g., the BSS color identifier value is set to a value that is reserved for specifying a PPDU that includes a transmission intended for one or more unassociated stations). In an illustrative embodiment, the BSS color identifier field 372 of the MU PPDU 300 is set to zero, which the communication protocol specifies i) is for indicating that the MU PPDU 300 includes a transmission intended for one or more unassociated stations and ii) cannot be chosen by an AP as the BSS color identifier for a WLAN. In other embodiments, the BSS color identifier field 372 of the MU PPDU 300 is set to another suitable value other than zero, which the communication protocol specifies i) is for indicating that the MU PPDU 300 includes a transmission intended for one or more unassociated stations and ii) cannot be chosen by an AP as the BSS color identifier for a WLAN.

In an embodiment, when a client station 154 is unassociated with an AP and is seeking to become associated with an AP, and when the client station 154 determines (e.g., the wireless network interface device 162 determines, the PHY processor 170 determines, the MAC processor 162 determines, the management frame processor 192 determines, etc.) that the BSS color identifier field 372 of the MU PPDU 300 is set to zero (or another suitable value), the client station 154 processes (e.g., the wireless network interface device 162 processes, the PHY processor 170 processes, the MAC processor 162 determines, the management frame processor 192 processes, etc.) the frame for unassociated stations in the MU PPDU 300 and, when appropriate uses information in the frame to become associated with the AP. In an embodiment, when a client station 154 is unassociated with an AP and is seeking to become associated with an AP, when the client station 154 determines (e.g., the wireless network interface device 162 determines, the PHY processor 170 determines, the MAC processor 162 determines, the management frame processor 192 determines, etc.) that the BSS color identifier field 372 of the MU PPDU 300 is not set to zero (or the other suitable value), the client station 154 stops processing the MU PPDU 300.

In an embodiment, when the BSS color identifier field 372 is set to zero, this signals to client stations that the AP is allowing unassociated stations to associate with the AP. In an embodiment, when the BSS color identifier field 372 is set to a non-zero value, this signals to client stations that the AP is not allowing unassociated stations to associate with the AP.

In some embodiments, the BSS color identifier field 372 is not set to a particular value to indicate that the MU PPDU 300 includes a transmission intended for one or more unassociated stations. For example, in some embodiments, the HE-SIG-A field 320 includes a subfield, separate from the BSS color identifier field 372, set to indicate whether the MU PPDU 300 includes a transmission intended for one or more unassociated stations.

In an embodiment, when a client station 154 is unassociated with an AP and is seeking to become associated with an AP, and when the client station 154 determines (e.g., the wireless network interface device 162 determines, the PHY processor 170 determines, the MAC processor 162 determines, the management frame processor 192 determines, etc.) that the subfield, separate from the BSS color identifier field 372, set to indicate that the MU PPDU 300 includes a transmission intended for one or more unassociated stations, the client station 154 processes (e.g., the wireless network interface device 162 processes, the PHY processor 170 processes, the MAC processor 162 determines, the management frame processor 192 processes, etc.) a frame in the MU PPDU 300 for unassociated stations and, when appropriate uses information in the frame to become associated with the AP. In an embodiment, when a client station 154 is unassociated with an AP and is seeking to become associated with an AP, when the client station 154 determines (e.g., the wireless network interface device 162 determines, the PHY processor 170 determines, the MAC processor 162 determines, the management frame processor 192 determines, etc.) that the subfield, separate from the BSS color identifier field 372, is not set to indicate that the MU PPDU 300 includes a transmission intended for one or more unassociated stations, the client station 154 stops processing the MU PPDU 300.

Figure 3:
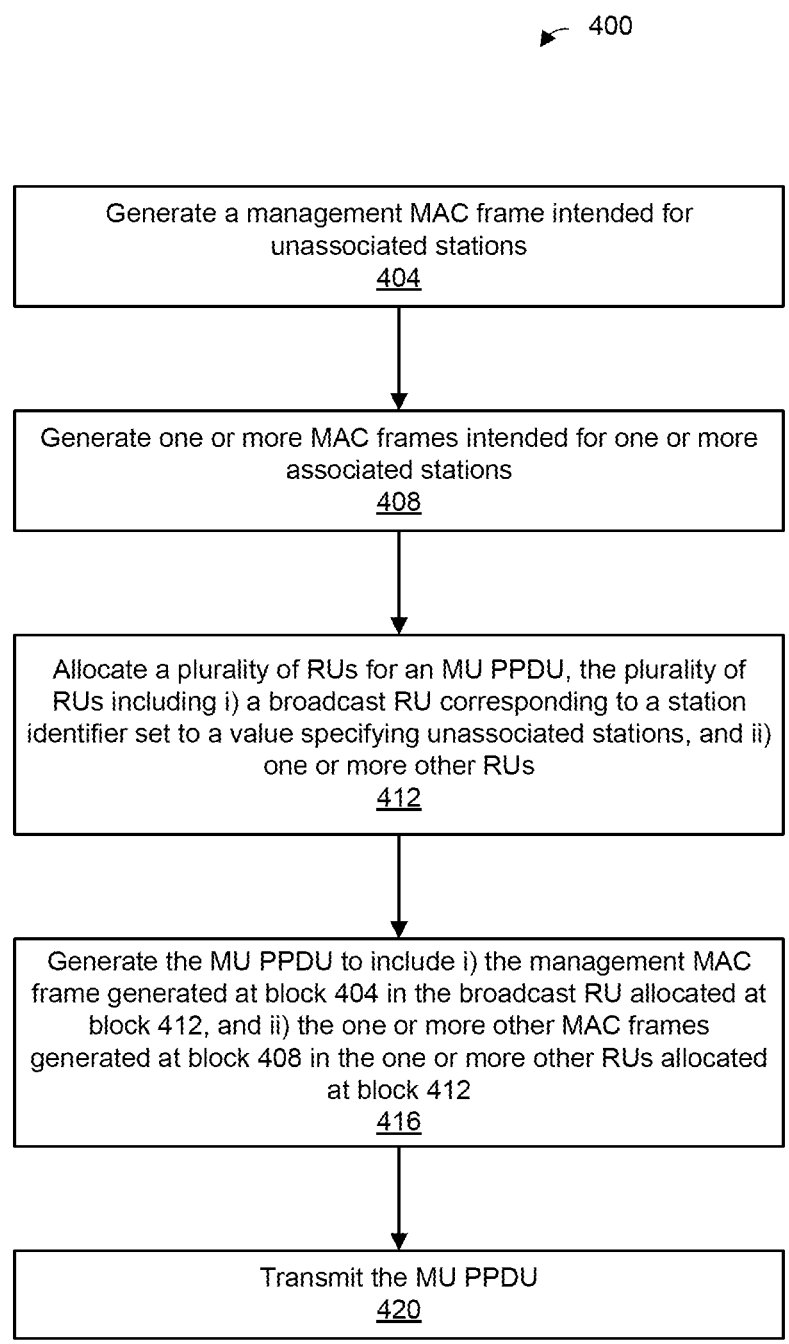
FIG. 3 is a flow diagram of an example method for generating and transmitting an MU PPDU having both i) a management frame intended for unassociated stations, and ii) one or more other frames intended for associated stations, according to an embodiment.

FIG. 3 is a flow diagram of an example method 400 for generating and transmitting an MU PPDU that includes information for both unassociated stations and associated stations, according to an embodiment. In some embodiments, the AP 114 of FIG. 1 is configured to implement the method 400, and the method 400 is described in the context of the AP 114 for explanatory purposes. In other embodiments, however, the method 400 is implemented by another suitable device such as the client station 154-1 or another suitable wireless communication device.

At block 404, the AP 114 generates (e.g., the wireless network interface device 122 generates, the MAC processor 126 generates, the management frame transmission controller generates, etc.) a management MAC frame intended for unassociated stations. In an embodiment, the management MAC frame includes information indicating network parameters of a wireless communication network managed by the AP 114 that is to be used by an unassociated station to join the wireless communication network. In an embodiment, generating the management MAC frame at block 404 comprises the AP 114 generating (e.g., the wireless network interface device 122 generating, the MAC processor 126 generating, the management frame transmission controller generating, etc.) a probe response MAC frame that includes information indicating network parameters of the wireless communication network that is to be used by an unassociated station to join the wireless communication network. In an embodiment, generating the management MAC frame at block 404 comprises the AP 114 generating (e.g., the wireless network interface device 122 generating, the MAC processor 126 generating, the management frame transmission controller generating, etc.) an unsolicited probe response MAC frame, e.g., a probe response MAC frame that is not transmitted in response to the AP 114 receiving a probe request MAC frame.

At block 408, the AP 114 generates (e.g., the wireless network interface device 122 generates, the MAC processor 126 generates, etc.) one or more MAC frames intended for one or more associated stations. In an embodiment, generating the one or more MAC frames at block 408 comprises the AP 114 generating (e.g., the wireless network interface device 122 generating, the MAC processor 126 generating, etc.) a broadcast MAC frame that includes information indicating network parameters of the wireless communication network that are to be used by associated stations for communicating in the wireless communication network. In an embodiment, generating the one or more MAC frames at block 408 comprises the AP 114 generating (e.g., the wireless network interface device 122 generating, the MAC processor 126 generating, etc.) a beacon frame for associated stations.

In an embodiment, generating the one or more MAC frames at block 408 comprises the AP 114 generating (e.g., the wireless network interface device 122 generating, the MAC processor 126 generating, etc.) a unicast MAC frame intended for a particular associated station.

At block 412, the AP 114 allocates (e.g., the wireless network interface device 122 allocates, the MAC processor 126 allocates, etc.) a plurality of RUs for the MU PPDU, the plurality of RUs including i) a broadcast RU corresponding to a station identifier set to a value specifying unassociated stations, and ii) one or more other RUs. In an embodiment, the AP 114 allocating the one or more other RUs at block 412 comprises the AP 114 allocating a broadcast RU corresponding to a station identifier set to a value specifying associated stations. In an embodiment, the AP 114 allocating the one or more other RUs at block 412 comprises the AP 114 allocating a unicast RU corresponding to a station identifier set to a value specifying a particular client station.

In an embodiment, the AP 114 allocating the plurality of RUs at block 412 comprises the AP 114 allocating a first broadcast RU corresponding to a station identifier set to 2045, and ii) a second broadcast RU corresponding to a station identifier set to value different than 2045. In an embodiment, the AP 114 allocating the plurality of RUs at block 412 comprises the AP 114 allocating a broadcast RU corresponding to a station identifier set to 2045, and ii) a unicast RU corresponding to a station identifier set to value corresponding to a particular associated station. In an embodiment, the AP 114 allocating the plurality of RUs at block 412 comprises the AP 114 allocating a broadcast RU corresponding to a station identifier set to 2045, and ii) a unicast RU corresponding to a station identifier set to zero.

At block 416, the AP 114 generates (e.g., the wireless network interface device 122 generates, the PHY processor 130 generates, etc.) the MU PPDU to include i) the management MAC frame generated at block 404 in the broadcast RU allocated at block 412, and ii) the one or more other MAC frames generated at block 408 in the one or more other RUs allocated at block 412. In an embodiment, the AP 114 generating the MU PPDU at block 616 comprises the AP 114 generating (e.g., the wireless network interface device 122 generating, the PHY processor 130 generating, etc.) a PHY preamble of the MU PPDU to include a BSS) color identifier field set to zero.

At block 420, the AP 114 transmits (e.g., the wireless network interface device 122 transmits, the PHY processor 130 transmits, the one or more transceivers 134 transmits, etc.) the MU PPDU.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as a random access memory (RAM), a read only memory (ROM), a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for transmitting management information in a wireless local area network (WLAN) managed by an access point (AP) device, the method comprising:
   generating, at the AP device, a management medium access control layer (MAC) frame having information indicating network parameters of the WLAN managed by the AP device, the management MAC frame comprising one of a beacon frame and a probe response frame;
   generating, at the AP device, one or more other MAC frames for one or more client stations that are associated with the WLAN;
   allocating, at the AP device, a plurality of resource units (RUS) for a multi-user physical layer protocol data unit (MU PPDU), the plurality of RUs including i) a broadcast RU, and ii) one or more other RUs;
   generating, at the AP device, the MU PPDU to include i) a physical layer (PHY) preamble, ii) the one of the beacon frame and the probe response frame in the broadcast RU, and iii) the one or more other MAC frames in the one or more other RUs, wherein generating the MU PPDU includes:
      in response to the AP device determining that the AP device is allowing unassociated stations to associate with the AP device, setting a station identifier in the PHY preamble corresponding to the broadcast RU to a first value that indicates the broadcast RU is intended for unassociated stations, and
      in response to the AP device determining that the AP device is not allowing unassociated stations to associate with the AP device, setting the station identifier in the PHY preamble corresponding to the broadcast RU to a second value that indicates the broadcast RU is not intended for unassociated stations; and
   transmitting, by the AP device, the MU PPDU.

2. The method of claim 1, wherein generating the MU PPDU includes:
   in response to the AP device determining that the AP device is allowing unassociated stations to associate with the AP device, setting the station identifier in the PHY preamble corresponding to the broadcast RU to 2045; and
   in response to the AP device determining that the AP device is not allowing unassociated stations to associate with the AP device, setting the station identifier in the PHY preamble corresponding to the broadcast RU to a value different from 2045.

3. The method of claim 1, wherein generating the MU PPDU includes:
   in response to the AP device determining that the AP device is allowing unassociated stations to associate with the AP device, setting the station identifier in the PHY preamble corresponding to the broadcast RU to 2044; and
   in response to the AP device determining that the AP device is not allowing unassociated stations to associate with the AP device, setting the station identifier in the PHY preamble corresponding to the broadcast RU to a value different from 2044.

4. The method of claim 1, wherein generating the MU PPDU includes:
   generating the PHY preamble to include a basic service set (BSS) color identifier field set to zero.

5. The method of claim 1, wherein:
   allocating the broadcast RU comprises allocating a first broadcast RU;
   allocating the one or more other RUs comprises allocating a second broadcast RU; and
   generating the MU PPDU comprises generating the MU PPDU to include a broadcast MAC frame in the second broadcast RU.

6. The method of claim 5, wherein generating the MU PPDU includes:
- setting the station identifier in the PHY preamble corresponding to the first broadcast RU to the first value that indicates the AP device is allowing unassociated stations to associate with the AP device; and
- generating the MU PPDU to include, in the second broadcast RU, a broadcast MAC frame intended for associated stations.

7. The method of claim 5, wherein:
- allocating the one or more other RUs further comprises allocating a unicast RU;
- generating the MU PPDU comprises generating the MU PPDU to include a unicast MAC frame in the unicast RU.

8. The method of claim 1, wherein:
- allocating the one or more other RUs comprises allocating a unicast RU;
- generating the MU PPDU comprises generating the MU PPDU to include a unicast MAC frame in the unicast RU.

9. An access point (AP) configured for operation according to at least a first communication protocol, the AP comprising:
- a wireless network interface having circuitry configured to:
  - generate a management medium access control layer (MAC) frame having information indicating network parameters of a wireless local area network (WLAN) managed by the AP device, the management MAC frame comprising one of a beacon frame and a probe response frame,
  - generate one or more other MAC frames for one or more client stations that are associated with the WLAN,
  - allocate a plurality of resource units (RUS) for a multi-user physical layer protocol data unit (MU PPDU), the plurality of RUs including i) a broadcast RU, and ii) one or more other RUs, and
  - generate the MU PPDU to include i) a physical layer (PHY) preamble, ii) the one of the beacon frame and the probe response frame in the broadcast RU, and iii) the one or more other MAC frames in the one or more other RUs, wherein generating the MU PPDU includes:
    - in response to the circuitry determining that the AP device is allowing unassociated stations to associate with the AP device, setting a station identifier in the PHY preamble corresponding to the broadcast RU to a first value that indicates the broadcast RU is intended for unassociated stations, and
    - in response to the circuitry determining that the AP device is not allowing unassociated stations to associate with the AP device, setting the station identifier in the PHY preamble corresponding to the broadcast RU to a second value that indicates the broadcast RU is not intended for unassociated stations; and
- wherein the circuitry is further configured to control the wireless network interface to transmit the MU PPDU.

10. The AP of claim 9, wherein the circuitry is further configured to:
- in response to the circuitry determining that the AP device is allowing unassociated stations to associate with the AP device, set the station identifier in the PHY preamble corresponding to the broadcast RU to 2045; and
- in response to the circuitry determining that the AP device is not allowing unassociated stations to associate with the AP device, set the station identifier in the PHY preamble corresponding to the broadcast RU to a value different from 2045.

11. The AP of claim 9, wherein the circuitry is further configured to:
- in response to the circuitry determining that the AP device is allowing unassociated stations to associate with the AP device, set the station identifier in the PHY preamble corresponding to the broadcast RU to 2044; and
- in response to the circuitry determining that the AP device is not allowing unassociated stations to associate with the AP device, set the station identifier in the PHY preamble corresponding to the broadcast RU to a value different from 2044.

12. The AP of claim 9, wherein the circuitry is further configured to:
- generate the PHY preamble to include a basic service set (BSS) color identifier field set to zero.

13. The AP of claim 9, wherein the circuitry is further configured to:
- allocate the broadcast RU as a first broadcast RU;
- allocate one of the other RUs as a second broadcast RU; and
- generate the MU PPDU to include a broadcast MAC frame in the second broadcast RU.

14. The AP of claim 13, wherein the circuitry is further configured to:
- set the station identifier in the PHY preamble corresponding to the first broadcast RU to the first value that indicates the AP device is allowing unassociated stations to associate with the AP device; and
- generate the MU PPDU to include, in the second broadcast RU, a broadcast MAC frame intended for associated stations.

15. The AP of claim 13, wherein the circuitry is further configured to:
- allocate one of the other RUs as a unicast RU; and
- generate the MU PPDU to include a unicast MAC frame in the unicast RU.

16. The AP of claim 9, wherein the circuitry is further configured to:
- allocate one of the other RUs as a unicast RU;
- generate the MU PPDU to include a unicast MAC frame in the unicast RU.

17. The AP of claim 13, wherein the wireless network interface comprises:
- one or more transceivers implemented using the circuitry.

18. The AP of claim 17, further comprising:
- one or more antennas coupled to the one or more transceivers.

* * * * *